United States Patent [19]

Laitar et al.

[11] Patent Number: 4,723,592

[45] Date of Patent: * Feb. 9, 1988

[54] PROCESS FOR PREPARING FOUNDRY CORES AND MOLDS

[75] Inventors: Robert A. Laitar, Woodridge; Eduardo Gmez, Chicago, both of Ill.

[73] Assignee: Acme Resin Corporation, Westchester, Ill.

[*] Notice: The portion of the term of this patent subsequent to Oct. 8, 2002 has been disclaimed.

[21] Appl. No.: 909,196

[22] Filed: Sep. 19, 1986

Related U.S. Application Data

[60] Division of Ser. No. 781,568, Sep. 30, 1985, Pat. No. 4,634,758, which is a continuation-in-part of Ser. No. 660,170, Oct. 12, 1984, Pat. No. 4,546,124.

[51] Int. Cl.$^4$ .................. C08G 18/06; C08G 8/36
[52] U.S. Cl. ..................... 164/527; 523/143
[58] Field of Search .................. 523/143; 164/527

[56] References Cited

U.S. PATENT DOCUMENTS

| 2,079,633 | 5/1937 | Rothrock . |
| 2,470,130 | 5/1949 | Bender . |
| 2,962,459 | 11/1960 | Ash . |
| 3,409,579 | 11/1968 | Robins . |
| 3,676,392 | 7/1972 | Robins . |
| 3,726,867 | 4/1973 | Robins . |
| 3,894,981 | 7/1975 | Kruglikov et al. . |
| 4,079,031 | 3/1978 | Sardessai et al. . |
| 4,116,916 | 9/1978 | Holik . |
| 4,122,054 | 10/1978 | Culbertson . |
| 4,157,324 | 6/1979 | Culbertson . |
| 4,317,896 | 3/1982 | Holik . |
| 4,358,570 | 11/1982 | Tobinga . |
| 4,436,881 | 3/1984 | Laitar . |
| 4,448,951 | 5/1984 | Rupert . |
| 4,473,669 | 9/1984 | Rupert . |
| 4,546,124 | 10/1985 | Laitar ................. 523/143 |
| 4,634,758 | 6/1987 | Laitar ................. 523/143 |

FOREIGN PATENT DOCUMENTS 3422510 12/1985 Fed. Rep. of Germany .
409397 3/1934 United Kingdom .
1363227 8/1974 United Kingdom .

OTHER PUBLICATIONS

Whitehouse, *Phenolic Resins*, pp. 66–69, 90, Iliffe Books, Ltd., London, 1967.
Angenandie Chemie, 51, No. 42 (1938), pp. 719–721, Greth.
Kunstoffe, 31, No. 10 (1941), pp. 346–351, Greth.

*Primary Examiner*—C. Warren Ivy

[57] ABSTRACT

A process for preparing an alkoxy-modified phenolic resole resin useful as the polyhydroxy component of a urethane binder composition. A phenol is reacted with a molar excess of an aldehyde in the presence of an alkaline catalyst and the resulting product is further reacted with a monohydric aliphatic alcohol under acidic conditions.

7 Claims, No Drawings

PROCESS FOR PREPARING FOUNDRY CORES AND MOLDS

This application is a division of co-pending application Ser. No. 781,568, filed Sept. 30, 1985, now U.S. Pat. No. 4,634,758, which is a continuation-in-part of co-pending application Ser. No. 660,170, filed Oct. 12, 1984, now U.S. Pat. No. 4,546,124.

FIELD OF THE INVENTION

This invention relates to alkoxy-modified phenolic resole resins useful in binder compositions, moldable compositions which include the binders and aggregate material, cores or molds made from the moldable compositions, and a process for making them. More particularly, the invention relates to a two-step process for making the alkoxy-modified phenolic resole resins from a phenol, an aldehyde, and an alcohol by means of suitable catalysts.

BACKGROUND OF THE INVENTION

Binders or binder systems for foundry cores and molds are well-known. In the foundry art, cores or molds for making metal castings are normally prepared from a mixture of an aggregate material, such as sand, and a binding amount of a binder or binder system. Typically, after the aggregate material and binder have been mixed, the resultant mixture is rammed, blown, or otherwise formed to the desired shape or patterns, and then cured with the use of catalyst and/or heat to a solid, cured state.

Resin binders used in the production of foundry molds and cores are often cured at high temperatures to achieve the fast-curing cycles required in foundries. However, in recent years, resin binders have been developed which cure at a low temperature, to avoid the need for high-temperature curing operations which have higher energy requirements and which often result in the production of undesirable fumes.

One group of processes which do not require heating in order to achieve curing of the resin binder are referred to as "cold-box" processes. In these processes, the binder components are coated on the aggregate material, such as sand, and the material is blown into a box of the desired shape. Curing of the binder is carried out by passing a gaseous catalyst at ambient temperatures through the molded resin-coated material. In such processes, the binder components normally comprise a polyhydroxy component and a polyisocyanate component. These cure to form a polyurethane in the presence of a gaseous amine catalyst.

Another group of binder systems which do not require gassing or heating in order to bring about curing are known as "no-bake" systems. These "no-bake" systems also frequently employ an aggregate material, such as sand coated with a polyhydroxy component and a polyisocyanate component. In this case, the coated sand is usually mixed with a liquid tertiary amine catalyst just before the sand is placed into a holding pattern or core box, and the material is allowed to cure at ambient temperatures or slightly higher.

Although developments in resinous binder systems which can be processed according to the "cold-box" or "no-bake" processes have resulted in the provision of useful systems, such systems with urethane binders still exhibit certain disadvantages. For example, cores and molds made with these binders have relatively low hot strength. Low hot strength results in foundry cores and molds that are prone to casting defects such as scabs, erosion, and burn-in. These defects have limited the use of systems employing urethane binders in certain iron and steel casting applications. A reduction in these casting defects would be of great value to foundries.

In a copending application, Ser. No. 660,170, filed Oct. 12, 1984, it is disclosed that the use of certain modified polyhydroxy components in the "no-bake" and "cold-box" processes overcomes this deficiency and provides cores and molds with greater hot strength. A new process for making these polyhydroxy components has been found.

SUMMARY OF THE INVENTION

In accordance with this invention, there is provided a process for preparing an alkoxy-modified phenolic resole resin useful as the polyhydroxy component of a urethane binder composition. The process comprises the steps of reacting a phenol with a molar excess of an aldehyde in the presence of an alkaline catalyst, followed by reacting the product with a monohydric alcohol under acidic conditions.

DETAILED DESCRIPTION OF THE INVENTION

In the practice of this invention, an alkoxy-modified phenolic resole resin is produced by a two-step process. In the first step, a phenol is heated with a molar excess of an aldehyde in the presence of an alkaline catalyst until most of the aldehyde has combined with the phenol. The mixture is acidified, and then, in a second step, the resin is modified by heating with a lower monohydric aliphatic alcohol at a pH below about 6.5.

Phenols suitable for use in the first step of the process of this invention are generally any of the phenols which may be utilized in the formation of phenolic resins, and include substituted phenols, as well as unsubstituted phenol per se. The nature of the substituent can vary widely, and exemplary substituted phenols include alkyl-substituted phenols, aryl-substituted phenols, cycloalkyl-substituted phenols, alkenyl-substituted phenols, alkoxy-substituted phenols, aryloxy-substituted phenols, and halogen-substituted phenols. Specific suitable exemplary phenols include in addition to phenol per se, o-cresol, m-cresol, p-cresol, 3,5-xylenol, 3,4-xylenol, 3,4,5-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. A preferred phenolic compound is phenol itself.

The aldehyde employed in the formation of the alkoxy-modified phenolic resole resin employed in this invention can also vary widely. Suitable aldehydes include any of the aldehydes heretofore employed in the formation of phenolic resins, such as formaldehyde, acetaldehyde, propionaldehyde, and benzaldehyde. In general, the aldehydes employed contain from 1 to 8 carbon atoms. The most preferred aldehyde is formaldehyde which may be used either as its aqueous solution or in its nonaqueous form as one of its solid polymers, such as paraformaldehyde.

A molar excess of aldehyde per mole of phenol is used to make the resole resins of this invention. It is preferable that the molar ratio of aldehyde to phenol be in the range of from about 1.2:1 to about 2.2:1.

The alkaline catalysts useful in the first step of the present process include any of such catalysts generally useful for preparing resole resins. Such catalysts include alkali and alkaline earth metal hydroxides. A preferred catalyst is calcium hydroxide.

Alcohols suitable for use in the second step of the process of this invention are generally primary and secondary monohydric aliphatic alcohols containing from 1 to 8 carbon atoms. Examples of useful alcohols are methanol, ethanol, n-propanol, isoproponal, n-butanol, and hexanol. Methanol is a preferred alcohol.

In the preparation of the alkoxy-modified phenolic resole resins of the present invention, sufficient alcohol is used to ensure that the alkoxy-modified liquid phenolic resole resin will have at least one alkoxymethylene group for every ten phenolic nuclei present in the resin. Use of at least about 0.25 mole of alcohol per mole of phenol will generally provide the desired degree of substitution. The alkoxymethylene groups have the general formula $-(CH_2O)n^R$ where R is the alkyl group of the alcohol used, and n is a small positive integer. These groups are substituents at the positions ortho and para to the phenolic hydroxyl groups in the resin.

As noted above, the second step of the process of this invention is carried out by reacting the product of the first step with an alcohol under acidic conditions. This is conveniently accomplished by acidifying the reaction mixture of the first step with an acid, such as a mineral acid before the alcohol is added. It is preferred to carry out the second step of the process at a pH between about 4.0 and 6.5.

Although the resin produced in the first step of the process will react with an alcohol in the presence of some water, the reaction of the second step proceeds more rapidly when water is removed. For this reason, it is preferable to remove most of the water present in the reaction mixture from the first step before the alcohol is added.

The alkoxy-modified phenolic resole resins prepared by the process of this invention are useful as the polyhydroxy component of a urethane binder composition. Such urethane binders are prepared by the reaction of the polyhydroxy component with an isocyanate component. When the resole resins are used for this purpose, it is preferable to dehydrate them to remove water produced in the reaction with the alcohol.

The isocyanate component which can be employed in the urethane binders may vary widely and has a functionality of 2 or more. Exemplary of the useful isocyanates are organic polyisocyanates such as tolylene-2,4-diisocyanate, tolylene-2,6-diisocyanate, and mixtures thereof, and particularly the crude mixtures thereof that are commercially available. A typical commercially available isocyanate is polymethylene polyphenylisocyanate such as PAPI-135 sold by Upjohn Company and having a Brookfield viscosity of about 200 centipoises at 25° C., and an isocyanate equivalent of 134.

Generally, the amounts of the polyhydroxy component and the isocyanate component employed in a binder composition are not critical and can vary widely. However, there should at least be enough of the isocyanate component present to give adequate curing of the binder.

The isocyanate component is generally employed in a range of from about 15% to about 400% by weight, based on the weight of the polyhydroxy component, and is preferably employed in a range of from about 20 to about 200%. Moreover, while a liquid isocyanate can be used in undiluted form, so long as there is sufficient solvent employed with the polyhydroxy component, solid or viscous isocyanates can also be utilized and are generally used with an organic solvent. In this respect, the isocyanate component may include up to 80% by weight of the solvent.

Furthermore, both the polyhydroxy and isocyanate components are, as a practical matter, preferably dissolved in solvents in order to provide component solvent mixtures of desirable viscosity and thus facilitate the use of the same, such as in coating aggregate material with the components. In this respect, sufficient solvents are employed to provide a Brookfield viscosity of solutions of the components which is below about 1000 centipoises and preferably less than about 500 centipoises. More specifically, while the total amount of solvent can vary widely, it is generally present in a range of from about 5% to about 70% by weight, based on total weight of the polyhydroxy component, and is preferably present in a range of from about 20% to about 60% by weight.

The solvents employed in the practice of this invention are generally mixtures of hydrocarbon and polar organic solvents such as organic esters.

Suitable exemplary hydrocarbon solvents include aromatic hydrocarbons such as benzene, toluene, xylene, ethyl benzene, high boiling aromatic hydrocarbon mixtures, heavy aromatic naphthas and the like. It is preferred to use hydrocarbon solvents with a flash point above 100° F.

Binder compositions using the resins prepared by the method of this invention can be cured by both the "cold-box" and "no-bake" processes. The compositions are cured by means of a suitable catalyst. While any suitable catalyst for catalyzing the reaction between the phenolic resin component and isocyanate component may be used, it is to be understood that when employing the "cold-box" process the catalyst employed is generally a volatile catalyst. On the other hand, where the "no-bake" process is employed, a liquid catalyst is generally utilized. Moreover, no matter which process is utilized, that is, the "cold-box" or the "no-bake" process, at least enough catalyst is employed to cause substantially complete reaction of the polyhydroxy and isocyanate components.

Preferred exemplary catalysts employed when curing the compositions by the "cold-box" process are volatile tertiary amine gases which are passed through a core or mold generally along with an inert carrier, such as air or carbon dioxide. Exemplary volatile tertiary amine catalysts which result in a rapid cure at ambient temperature include trimethylamine, triethylamine and dimethylethylamine and the like.

On the other hand, when utilizing the compositions in the "no-bake" process, liquid tertiary amine catalysts are generally and preferably employed. Exemplary liquid tertiary amines which are basic in nature include those having a $pK_b$ value in a range of from about 4 to about 11. The $pK_b$ value is the negative logarithm of the dissociation constant of the base and is a well-known measure of the basicity of a basic material. The higher this number is, the weaker the base. Bases falling within the mentioned range are generally organic compounds containing one or more nitrogen atoms. Preferred among such materials are heterocyclic compounds containing at least one nitrogen atom in the ring structure. Specific examples of bases which have a $pK_b$ value within the range mentioned include 4-alkylpyridines wherein the alkyl group has from 1 to 4 carbon atoms, isoquinoline, arylpyridines, such as phenylpyaridine, pyridine, acridine, 2-methoxypyridine, pyridazines, 3-chloropyridine, quinoline, N-methylimidazole, 4,4-dipyridine, phenylpropylpyridine, 1-methylbenzimidazole and 1,4-thiazine. Additional exemplary, suitable preferred catalysts include but are not limited to tertiary amine catalysts such as N,N-dimethylbenzylamine, triethylamine, tribenzylamine, N,N-dimethyl-1,3-propanediamine, N,N-dimethylethanolamine and triethanolamine. It is to be understood that various metal organic compounds can also be utilized alone as catalysts or in combination with the previously-mentioned catalysts. Examples of useful metal organic compounds which may be employed as added catalytic materials are cobalt naphthenate, cobalt octoate, dibutyltin dilaurate, stannous octoate and lead naphthenate and the like. When used in combinations, such catalytic materials, that is the metal organic compounds and the amine catalysts, may be employed in all proportions with each other.

The amine catalysts, if desired, can be dissolved in suitable solvents such as, for example, the hydrocarbon solvents mentioned hereinabove. The liquid amine catalysts are generally employed in a range of from about 0.5% to about 15% by weight, based on the weight of the phenolic resin component.

When employing a binder composition in the "no-bake" process, the curing time can be controlled by varying the amount of catalyst added. In general, as the amount of catalyst is increased, the cure time decreases. Furthermore, curing takes place at ambient temperature without the need for subjecting the compositions to heat, or gassing or the like. In this regard, however, in usual foundry practice preheating of the sand is often employed to raise the temperature of the sand to from about 30° F. up to as high as 120° F., and preferably up to about 75° F. to 100° F. in order to accelerate the reactions and control temperature and thus provide a substantially uniform operating temperature on a day-to-day basis.

While the binder compositions may be employed by admixing the same with a wide variety of particulate materials, such as limestone, calcium silicate and gravel and the like, in order to bind the same, and the admixture then manipulated in suitable fashion to form coherent shaped structures, they are particularly useful in the foundry art as binding compositions for foundry sand. When so employed, the amount of binder and sand can vary widely and is not critical. On the other hand, at least a binding amount of the binding composition should be present in order to coat substantially completely and uniformly all of the sand particles and to provide a uniform admixture of the sand and binder, so that when the admixture is conveniently shaped as desired and cured, there is provided a strong, uniform, shaped article which is substantially uniformly cured throughout, thus minimizing breakage and warpage during handling of the shaped article, such as, for example, sand molds or cores, so made. In this regard, the binder may be present in a moldable composition in a range of from about 0.7% to about 6.0% by weight based on the total weight of the composition.

Additives normally utilized in foundry manufacturing processes can also be added to the compositions during the sand coating procedure. Such additives include materials such as iron oxide, clay, carbohydrates, potassium fluoroborates, wood flour and the like.

Other commonly employed additives can be optionally used in the binder compositions. Such additives include, for example, organo silanes which are known coupling agents. The use of such materials may enhance the adhesion of the binder to the aggregate material. Examples of useful coupling agents of this type include amino silanes, epoxy silanes, mercapto silanes, hydroxy silanes and ureido silanes such as, for example, $\gamma$-aminopropyltrimethoxysilane, $\gamma$-hydroxypropyltrimethoxysilane, 3-ureidopropyltriethoxysilane, $\gamma$-mercaptopropyltrimethoxysilane, $\gamma$-glycidoxypropyltrimethoxysilane, $\beta$-(3,4-epoxycyclohexyl)trimethoxysilane, N-$\beta$-(aminoethyl) $\gamma$-aminopropyltrimethoxysilane and the like.

In general, the process for making a moldable composition comprises admixing aggregate material with at least a binding amount of the alkoxy-modified phenolic resole resin component. The resin is dissolved in sufficient solvent to reduce the viscosity of the phenolic resinous component to below about 1000 centipoises. This solvent comprises hydrocarbon solvents, polar organic solvents and mixtures thereof. Then an isocyanate component, having a functionality of two or more, is added and mixing is continued to uniformly coat the aggregate material with the phenolic resin and isocyanate components. The admixture is suitably manipulated, as for example, by distributing the same in a suitable core box or pattern. A sufficient amount of catalyst is added to substantially completely catalyze the reaction between the components. The admixture is cured forming a shaped product.

It is to be understood that there is no criticality in the order of mixing the constituents with the aggregate material. On the other hand, the catalyst should generally be added to the mixture as the last constituent of the composition so that premature reaction between the components does not take place. It is to be further understood that as a practical matter, the phenolic resin component can be stored separately and mixed with solvent just prior to use or, if desirable, mixed with solvent and stored until ready to use. Such is also true with the isocyanate component. On the other hand, as a practical matter, the phenolic and isocyanate components should not be brought into contact with each other until ready to use in order to prevent any possible premature reaction between them. The components may be mixed with the aggregate material either simultaneously or on after the other in suitable mixing devices, such as mullers, continuous mixers, ribbon blenders and the like, while continuously stirring the admixture to insure uniform coating of aggregate particles.

More specifically, however, when the admixture is to be cured according to "cold-box" procedures, the admixture after shaping as desired, is subjected to gassing with vapors of an amine catalyst. Sufficient catalyst is passed through the shaped admixture to provide substantially complete reaction between the components. The flow rate is dependent, of course, on the size of the shaped admixture as well as the amount of phenolic resin therein.

In contrast, however, when the admixture is to be cured according to "no-bake" procedures, the catalyst is generally added to the aggregate material simultaneously while coating the aggregate material with the phenolic and isocyanate components. The admixture is then shaped and simply permitted to cure until reaction between the components is substantially complete, thus forming a shaped product such as a foundry core or mold. On the other hand, it is to be understood that the catalyst may also be admixed with either one of the components prior to coating of the aggregate material with the components.

Consequently, by so proceeding, as indicated with an admixture of foundry sand and a binding amount of the phenolic and isocyanate components with a catalyst, there is formed a foundry core or mold comprising foundry sand and a binding amount of a binder composition comprising the reaction product of the phenolic and isocyanate components.

The following specific examples illustrate the present invention. They are not intended to limit the invention in any way. Unless otherwise indicated, all parts and percentages are by weight.

EXAMPLE 1

In a 12-liter flask equipped with a stirrer, reflux condenser and thermometer was placed 3.76 kg of phenol and 3.0 kg of 50% aqueous formaldehyde solution. The temperature was adjusted to 40° C. and 18 g of calcium hydroxide was added. The reaction mixture was heated at 70° C. for 1 hour. Then an additional 18 g of calcium hydroxide was added and the mixture was held at 70° C. until the free formaldehyde content was less than 2%. Free formaldehyde was determined by the standard hydroxylamine-hydrochloride method. This mixture (Mixture A) was cooled to 30° C. and used to prepare the following resins.

To a 1.6-kg portion of Mixture A was added a solution of 7.5 g of 75% phosphoric acid in 25.5 g water to reduce the pH to 5.0. Water was removed from this material by heating under reduced pressure at 50° C. until the refracture index measured at 25° C. was 1.569. Then 124 g of methanol was added and the mixture was refluxed for 3 hrs. Vacuum was applied and the mixture was heated for 2 hrs under vacuum to give a methoxy-modified phenolic resole resin.

The resin was analyzed using carbon-13 NMR. Integrated value of the carbon absorption of the methoxy group shifting at 57-58 ppm was compared with the value of the absorption of the carbon connected to the hydroxyl group of the phenols shifting at 145-160 ppm. This analysis indicated that the resin contained one methoxymethylene group for every 5.6 phenolic hydroxyl groups. Carbon-13 NMR analysis also indicated that the preponderance of bridges joining the phenolic nuclei in the resin are ortho-ortho benzylic ether bridges.

A solution of the resin (designated Resin 1) was used as the polyhydoxy component in foundry urethane binders. This solution was prepared by dissolving 55 g of the resin in a mixture of 45 g of dibasic ester. Then 0.4 g of silane A-1160 was also added. Dibasic ester, available from Du Pont, Wilmington, Delaware, contains approximately 25% dimethyl succinate, 50% dimethyl glutarate, and 25% dimethyl adipate. The silane is sold by the Union Carbide Corp., New York, NY, as a 50% solution of 3-ureidopropyltriethoxysilane in methanol. The isocyanate solution used for the preparation of the urethane resin was prepared by dissolving 71% polymethylene polyphenylisocyanate, in 29% of hydrocarbon solvent. The hydrocarbon solvent is an aromatic hydrocarbon having a flash point above 100° F.

To a K-45 KitchenAid mixer was added 2500 g of silica sand. The mixer was started and 17.2 g of the methoxy-modified resole resin solution and 14.1 g of the polymeric isocyanate were added. Then 0.8 ml of a tertiary amine catalyst solution was added. (The catalyst is a commercial catalyst, No. 5082, available from the Acme Resin Corp., Forest Park, Ill.) The sand was discharged from the mixer 1 minute after the addition of the catalyst. A portion of the sand was used to make a pyramid core. A thermometer was inserted into the core. The stripping time was determined as the time at which the core is so hard that the thermometer can no longer be pushed into the core. All samples from this and the following examples showed stripping times of 6-7 minutes. An additional amount of the coated sand was used to prepare cured 1½-inch diameter×2-inch cylindrical cores. The relative collapsibility of the cores was determined by placing the core specimens in a Dietert No. 785 Thermolab Dilatometer. Collapsibility of the cores at 1010° C. under 50 psi pressure was measured. The time required for the core to collapse under pressure and heat was determined. The longer the time to collapse, the higher the thermal strength of the core. A final portion of the coated sand was used to prepare cores for use in the AFS hot distortion test. In this test, a piece of bonded sand, 1×5/16×4½ inches, is loaded as a cantilever and strongly heated in the center of one face while a deflection sensor rests on the free end of the strip. The length of time until the test piece collapses is the hot distortion time.

A second resin (designated Resin 2) was prepared from Mixture A using the same general procedure as was used for Resin 1 except that 287 g of n-butanol was used in place of the methanol. This resin was also analyzed by carbon-13 NMR using the integrated value of the alpha-carbon of the butoxy group shifting at 70 ppm. This analysis indicated that the resin contained one butoxymethylene group for every 4.3 phenolic hydroxyl groups. A solution of the butoxy-modified phenolic resole resin, Resin 2, was used as the polyhydroxy compound in a urethane binder for foundry sand cores employing the same test conditions as given for Resin 1. Results of tests using Resin 1, Resin 2, and of a comparative resin are reported in Table 1.

The comparative test resin was prepared from Mixture A following the same directions as used to make Resin 1 except that no alcohol was added to the reaction mixture. A solution of this unmodified phenolic resole resin was also used as the polyhydroxy compound in a urethane binder for foundry sands employing the same test conditions as given for Resin 1.

The superior hot strength of the cores prepared from the methoxy- and butoxy-modified phenolic resole resins is clearly shown by their superior hot distortion and dilatometer collapsibility times when compared with those of the comparative test cores prepared from the unmodified phenolic resole resin as seen from the results in Table I.

TABLE I

| Resin Used in Test Cores | Hot Distortion Time (sec) | Dilatometer Collapsibility Time (sec) |
| --- | --- | --- |
| Resin 1 (With Methoxy Groups) | 220 | 378 |
| Resin 2 (With Butoxy Groups) | 180 | 334 |
| Comparative Test Resin | 128 | 165 |

TABLE I-continued

| Resin Used in Test Cores | Hot Distortion Time (sec) | Dilatometer Collapsibility Time (sec) |
|---|---|---|
| (No Alkoxy Groups) | | |

EXAMPLE 2

The general procedure of Example 1 was followed for the reaction between phenol and formaldehyde except that 3.6 kg of 50% aqueous formaldehyde was used. This is a ratio of 1.5 moles of formaldehyde per mole of phenol. The resulting resin mixture (Mixture B) was used to prepare the following alkoxy-modified resole resins.

A 1.75-kg portion of Mixture B was acidified with 9.5 g of phosphoric acid in 28.5 g of water. Dehydration under vacuum and reaction with 150 g of methanol was carried out following the procedure used for Resin 1 of Example 1. The resulting product was designated Resin 3. Carbon-13 NMR analysis indicated that the resin contained one methoxymethylene group for every 3.6 phenolic hydroxyl groups.

A second 1.75-kg portion of Mixture B was acidified, dehydrated and reacted with 215 g of ethanol following the procedure used to make Resin 3. The resulting product was designated Resin 4.

A third 1.75-kg portion of Mixture B was similarly treated and combined with 347 g of n-butanol. The resulting product was designated Resin 5. Carbon-13 NMR analysis indicated that the resin contained one butoxymethylene group for every 4.2 phenolic hydroxyl groups.

Finally, a fourth 1.75-kg portion of Mixture B was acidified with 9.5 g of phosphoric acid and the mixture was dehydrated to give a comparative test resin containing no alkoxy groups.

Solutions of Resins 3, 4, 5, and the control resin were prepared and used with polyisocyanate as foundry sand binders following the same test procedures as used in Example 1. Test results, given in Table II, again show that the cores prepared usin the alkoxy-modified resole resins have greater test strength than the cores prepared using the unmodified resole resin.

TABLE II

| Resin Used in Test Cores | Hot Distortion Time (sec) | Dilatometer Collapsibility Time (sec) |
|---|---|---|
| Resin 3 (With Methoxy Groups) | 189 | 326 |
| Resin 4 (With Ethoxy Groups) | 200 | 404 |
| Resin 5 (With Butoxy Groups) | 209 | 343 |
| Comparative Test Resin (No Alkoxy Groups) | 172 | 133 |

EXAMPLE 3

This example illustrates use of the alkoxy-modified phenolic resole resin in the "cold-box" process. The resin solutions were prepared as in Example 1 using Resins 3, 5, and the comparative test resin of Example 2. The resole resin solution (17.9 g) and 14.6 g of a 75% polymethylene polyphenyl-isocyanate solution were mixed with 2.5 kg of 410 sand using a K-45 KitchenAid mixer. The foundry mix was blown into a Redford CBT-1 core blower. Cores were blown at 50 psi air pressure and gassed 3 seconds with a 12% dimethylethylamine in $CO_2$ at 30 psi and then for 5 seconds with purge air at 30 psi. Tensile strengths were measured 1 minute after curing using a Detroit Testing Machine Company Model CST tensile tester. Hot distortion times and dilatometer collapsibility times were also measured using the general tests described in Example 1 for cores that have been held overnight before testing.

The results given in Table III show that the cores prepared from the alkoxy-modified phenolic resole resins by the "cold-box" process have superior hot strengths to those prepared from a comparable unmodified resole resin in the same process.

TABLE III

| Resin Used in Test Cores | Tensile Strength After 1 Minute (psi) | Hot Distortion Time (sec) | Dilatometer Collapsibility Time (sec) |
|---|---|---|---|
| Resin 3 (With Methoxy Groups) | 82 | 85 | 143 |
| Resin 5 (With Butoxy Groups) | 53 | 93 | 138 |
| Comparative Test Resin (No Alkoxy Groups) | 17 | 68 | 112 |

Thus, it is apparent that there has been provided, in accordance with the invention, a process for making a polyhydroxy component of a foundry binder composition that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to include all such alternatives, modifications, and variations as set forth within the spirit and broad scope of the appended claims.

What is claimed is:

1. In a process for making foundry cores or molds which comprises admixing aggregate material, such as foundry sand or the like, and a binding amount of a binder composition comprising a polyhydroxy component, an isocyanate component having a functionality of two or more, and sufficient catalyst to catalyze substantially completely the reaction between the polyhydroxy component and the isocyanate component wherein the improvement comprises using a polyhydroxy component consisting essentially of a alkoxy-modified phenolic resole resin prepared by the steps of (a) reacting a phenol with a molar excess of an aldehyde in the presence of an alkaline catalyst, and then (b) reacting the product of Step (a) with a monohydric alcohol under acidic conditions.

2. The process of claim 1 the phenol is unsubstituted phenol and the aldehyde is formaldehyde.

3. The process of claim 2 the amount of monohydric alcohol used in Step (b) is at least 0.25 mole of said alcohol per mole of phenol used in Step (a) and the alkoxy-modified phenolic resole resin contains at least one alkoxymethylene group for every ten phenolic nuclei in the resin.

4. The process of claim 3 wherein the product of Step (a) is dehydrated before carrying out Step (b).

5. The process of claim 4 the product of Step (b) is dehydrated to remove water produced in the reaction with the alcohol.

6. The process of claim 5 in the monohydric aliphatic alcohol is methanol.

7. The process of claim 5 wherein the monohydric aliphatic alcohol is selected from the group ethanol and n-butanol.

* * * * *

UNITED STATES PATENT AND TRADEMARK OFFICE
CERTIFICATE OF CORRECTION

PATENT NO. : 4,723,592
DATED : February 9, 1988
INVENTOR(S) : Robert A. Laitar and Eduardo Gomez It is certified that error appears in the above-identified patent and that said Letters Patent are hereby corrected as shown below:

Column 3, line 22, "$-CH_2O)n^R$" should read -- $-CH_2O)_nR$ --.
Column 6, line 50, "on" should read --one--.
Column 7, line 53, "polyhydoxy" should read --polyhydroxy--.
Column 8, line 14, "1½-inch" should read --1-1/8-inch--.
Column 9, line 44, "usin" should read --using--.
Column 10, claim 1, line 53, "a" should read --an--.
Column 10, claim 2, after "claim 1" insert the word --wherein--.
Column 10, claim 3, after "claim 2" insert the word --wherein--.
Column 11, claim 5, after "claim 4" insert the word --wherein--.
Column 12, claim 6, after "claim 5" insert the word --wherein--.

Signed and Sealed this

Twenty-third Day of August, 1988

Attest:

DONALD J. QUIGG

Attesting Officer          Commissioner of Patents and Trademarks